US011860028B2

(12) United States Patent
Wakisaka et al.

(10) Patent No.: US 11,860,028 B2
(45) Date of Patent: Jan. 2, 2024

(54) VIBRATION DETECTION METHOD WITH IMPROVED SIGNAL PROCESSING

(71) Applicant: NIPPON TELEGRAPH AND TELEPHONE CORPORATION, Tokyo (JP)

(72) Inventors: Yoshifumi Wakisaka, Musashino (JP); Daisuke Iida, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 232 days.

(21) Appl. No.: 17/427,792

(22) PCT Filed: Jan. 22, 2020

(86) PCT No.: PCT/JP2020/002028
§ 371 (c)(1),
(2) Date: Aug. 2, 2021

(87) PCT Pub. No.: WO2020/162168
PCT Pub. Date: Aug. 13, 2020

(65) Prior Publication Data

US 2022/0128395 A1 Apr. 28, 2022

(30) Foreign Application Priority Data

Feb. 5, 2019 (JP) ................................ 2019-019079

(51) Int. Cl.
*G01H 9/00* (2006.01)

(52) U.S. Cl.
CPC .................................. *G01H 9/004* (2013.01)

(58) Field of Classification Search
None
See application file for complete search history.

(56) References Cited

U.S. PATENT DOCUMENTS 9,287,972 B2 * 3/2016 Kishida .................. G01H 9/004
2017/0350734 A1 * 12/2017 Ji ....................... G01D 5/35358

FOREIGN PATENT DOCUMENTS

EP 3889560 A1 10/2021
WO WO-2012030814 A2 * 3/2012 ............ E21B 41/00

OTHER PUBLICATIONS

Ali Masoudi, T. P. Newson, "Contributed Review: Distributed optical fibre dynamic strain sensing." Review of Scientific Instruments, vol. 87, pp. 011501 (2016).

(Continued)

*Primary Examiner* — Brandi N Hopkins
*Assistant Examiner* — Nigel H Plumb
(74) *Attorney, Agent, or Firm* — Harness, Dickey & Pierce, P.L.C.

(57) ABSTRACT

A vibration detection method is presented to accurately detect vibration physically applied to an optical fiber, using a simple determination reference. In a vibration detection method, scattered light of a given target segment of a measurement target fiber is indicated by vectors of an in-phase component and a quadrature component, and a triangular shape constituted by a near-end-side vector of the target segment and a far-end-side vector is used as a physical amount to be tracked. That is, it is determined whether or not there is vibration based on a change in shape of the triangular shape with respect to a reference state. This is a detection method in which DAS-I and DAS-P are combined, a simple determination reference such as shape change of a triangular shape is employed, and overlooking of vibration detection can be reduced.

8 Claims, 5 Drawing Sheets

1 2 3 4 5 6 7 8 9 10 11 12 13 14 15 16 17 17a 17b 17c

(56) References Cited

OTHER PUBLICATIONS

Ken'ichi Nishiguchi, Li Che-Hsien, Arthur Guzik, Mitsunori Yokoyama, Kinzo Kishida, "Fabrication of Fiber-Optic Distributed Acoustic Sensor and Its Signal Processing", IEICE Technical Report, 115 (202), pp. 29-34 (2015).

* cited by examiner

VIBRATION DETECTION METHOD WITH IMPROVED SIGNAL PROCESSING

CROSS-REFERENCE TO RELATED APPLICATIONS

This application is a 371 U.S. National Phase of International Application No. PCT/JP2020/002028 filed on Jan. 22, 2020, which claims priority to Japanese Application No. 2019-019079 filed on Feb. 5, 2019. The entire disclosures of the above applications are incorporated herein by reference.

TECHNICAL FIELD

The present disclosure relates to a vibration detection method for detecting physical vibration applied to an optical fiber, a signal processing device, and a program.

BACKGROUND ART

A method called DAS (Distributed Acoustic Sensing) in which a pulse test light enters a measurement target optical fiber and rearward scattered light obtained through Rayleigh scattering is detected has been known as a means for measuring physical vibration applied to the optical fiber in a distributed manner in the optical fiber lengthwise direction (e.g., see NPL 1).

With DAS, change in the optical path length of the optical fiber caused by physical vibration applied to the optical fiber is detected, and thus vibration sensing is performed. By detecting vibration, it is possible to detect the motion of an object or the like in the surrounding area of the measurement target optical fiber.

Examples of a method for detecting rearward scattered light in DAS include a method in which the intensity of the scattered light from each location of the measurement target optical fiber is measured and change over time in the scattered light intensity is observed, and this is called DAS-I (DAS-intensity). DAS-I has a characteristic of simplifying an device configuration, but since the change in the optical path length of the fiber caused by vibration cannot be quantitatively calculated based on the scattered light intensity, DAS-I is a qualitative measurement method (e.g., see NPL 2).

On the other hand, DAS-P (DAS-phase), which is a method in which the phase of scattered light from each location of the measurement target optical fiber is measured and change in the phase over time is observed has also been researched and developed. In DAS-P, the device configuration and the signal processing are more complicated than in DAS-I, but since the phase changes linearly with respect to a change in the optical path length of the fiber caused by vibration and the change rate is also the same in the optical fiber lengthwise direction, quantitative measurement of vibration is possible, and the vibration applied to the measurement target optical fiber can be reproduced faithfully (e.g., see NPL 2).

Examples of device configurations for detecting the intensity and phase of scattered light include a configuration in which rearward scattered light from the measurement target optical fiber is directly detected using a photodiode or the like and a configuration using coherent detection in which detection is performed by multiplexing with a reference light prepared separately (e.g., see NPL 1).

CITATION LIST

Non Patent Literature

[NPL 1] Ali Masoudi, T. P. Newson, "Contributed Review: Distributed optical fibre dynamic strain sensing." Review of Scientific Instruments, vol. 87, pp. 011501 (2016)

[NPL 2] Ken'ichi Nishiguchi, Li Che-Hsien, Arthur Guzik, Mitsunori Yokoyama, Kinzo Kishida, "Fabrication of Fiber-Optic Distributed Acoustic Sensor and Its Signal Processing", IEICE Technical Report, 115 (202), pp. 29-34 (2015)

SUMMARY OF THE INVENTION

Technical Problem

In measurement using DAS, noise of a measurement device is present, such as thermal noise of a PD for detecting light, noise at a later electricity stage, and shot noise resulting from the light. Accordingly, the influence of the noise of the measurement device appears also in the intensity and the phase of the scattered light to be measured. For this reason, in order to accurately detect the vibration applied physically, it is necessary to determine whether or not the changes in the intensity and the phase of the scattered light resulting from actual vibration have been hidden by the noise of the measurement device.

In DAS-P, not only the value of the phase of the scattered light, but also the value of the intensity of the scattered light is needed in the determination of whether or not the changes in phase of the scattered light measured at each position at each time have been hidden by the noise of the measurement device. This is because the uncertainty of the phase change of the scattered light measured at each position at each time depends on the noise of the measurement device and the intensity of the scattered light. Since the intensity of the scattered light changes depending on the time and the position as a result of the scattered lights scattered from each position of the measurement target optical fiber interfering with each other, the vibration cannot be regarded as being detected if the phase change in the scattered light is simply large, and there is a problem in that in order to regard the vibration as being detected, a more complicated determination reference is necessary. Also, since attention is given to only the phase change in the scattered light, there is a problem in that vibration detection is difficult if the intensity change in the scattered light is large but the phase change is small.

In DAS-I, the uncertainty of the intensity of the scattered light measured at each position of each time is determined based on the noise of the measurement device. For this reason, the determination of whether or not the changes are hidden by the noise of the measurement device can be performed using the same determination reference at each position and each time. However, in DAS-I, the magnitude of the change in the scattered light intensity and the magnitude of the change in the optical path length of the fiber due to vibration are not quantitatively associated with each other. For this reason, even if a large vibration is actually applied to the optical fiber, if the change in the scattered light intensity is small, there is a problem in that the change will be hidden by the noise and it will be difficult to detect vibration.

In view of this, in order to solve the above-described problem, the present invention aims to provide a vibration detection method, a signal processing device, and a program according to which it is possible to accurately detect the vibration applied physically to an optical fiber using a simple determination reference.

Means for Solving the Problem

In order to achieve the above-described object, the vibration detection method according to the present invention detects vibration applied physically to the optical fiber by following the change in a physical amount that is different from the phase and the intensity of scattered light.

Specifically, the vibration detection method according to the present invention includes performing: measuring in-phase components and quadrature components of scattered light generated by a light pulse that has entered a measurement target optical fiber; acquiring reference vectors and measurement vectors, the reference vectors constituted by, among the in-phase components and the quadrature components of the scattered light, in-phase components and quadrature components at both ends of a given target segment of the measurement target optical fiber in a reference state, and the measurement vectors constituted by in-phase components and quadrature components at both ends of the target segment of the measurement target optical fiber at a given time; and determining that physical vibration has been applied to the target segment of the measurement target optical fiber when a triangular shape formed by a vector on a near end side and a vector on a far end side of the target segment of the measurement target optical fiber is envisioned for each of the reference vectors and the measurement vectors and shape change in a triangular shape formed by the measurement vectors with respect to a triangular shape formed by the reference vectors is a predetermined value or more.

Also, the signal detection device according to the present invention includes: receiver for receiving in-phase components and quadrature components of scattered light generated by a light pulse that has entered a measurement target optical fiber, and acquiring reference vectors and measurement vectors, the reference vectors constituted by, among the in-phase components and the quadrature components of the scattered light, in-phase components and quadrature components at both ends of a given target segment of the measurement target optical fiber in a reference state, and the measurement vectors constituted by in-phase components and quadrature components at both ends of the target segment of the measurement target optical fiber at a given time; and detector for determining that physical vibration has been applied to the target segment of the measurement target optical fiber when a triangular shape formed by a vector on a near end side and a vector on a far end side of the target segment of the measurement target optical fiber is envisioned for each of the reference vectors and the measurement vectors and shape change in a triangular shape formed by the measurement vectors with respect to a triangular shape formed by the reference vectors is a predetermined value or more.

In the present vibration detection method, scattered light of a given target segment of the measurement target fiber is indicated by vectors of an in-phase component and a quadrature component, and a triangular shape formed by a near-end-side vector and a far-end-side vector of the target region is used as the physical amount to be tracked. That is, it is determined whether or not there is vibration based on the shape change of the triangular shape with respect to a reference state. This is a detection method in which DAS-I and DAS-P are combined, and a simple determination reference such as shape change of a triangular shape is employed, and overlooking of vibration detection can be reduced.

Accordingly, the present invention can provide a vibration detection method and a signal processing device according to which it is possible to accurately detect vibration physically applied to an optical fiber using a simple determination reference.

The following two methods are examples of methods for detecting shape change in a triangular shape.

In one method, on the near end side and the far end side of the target segment of the measurement target optical fiber, a difference between a vector obtained by rotating the measurement vector using a rotation matrix and the reference vector is calculated, and the minimum value of the difference obtained when rotation using the rotation matrix is changed is used as the shape change.

For example, a threshold value can be provided for the smallest difference, and it can be determined that vibration has occurred when the threshold value is exceeded.

In another method, a value $D_{min}$ obtained using formula (C1) is used as the shape change, where $r_1$ is the size of the vector on the far end side of the target segment of the measurement target optical fiber among the reference vectors, and $\theta_1$ is the angle of the vector with respect to an axis of an in-phase component, $r_2$ is the size of the vector on the near end side of the target segment of the measurement target optical fiber among the reference vectors, and $\theta_2$ is the angle of the vector with respect to an axis of an in-phase component, $r_3$ is the size of the vector on the far end side of the target segment of the measurement target optical fiber among the measurement vectors, and $\theta_3$ is the angle of the vector with respect to an axis of an in-phase component, and $r_4$ is the size of the vector on the near end side of the target segment of the measurement target optical fiber among the measurement vectors, and $\theta_4$ is the angle of the vector with respect to an axis of an in-phase component.

$$D_{min} = \sqrt{r_1^2 + r_2^2 + r_3^2 + r_4^2 - W} \tag{C1}$$

$$W = 2\sqrt{r_1^2 r_3^2 + r_2^2 r_4^2 + 2r_1 r_2 r_3 r_4 \cos[(\theta_1 - \theta_2) - (\theta_3 - \theta_4)]}$$

For example, a threshold value can be provided for $D_{min}$, and it can be determined that vibration has occurred when the threshold value is exceeded.

In the vibration detection method according to the present invention, repeating the acquiring and the determining while moving the target region in the lengthwise direction of the measurement target optical fiber and a lengthwise direction distribution of vibration applied to the measurement target optical fiber is acquired.

A program according to the present invention is a program for causing a computer to function as the signal processing device. The signal processing device of the present invention can be realized also by a computer and a program, the program can also be recorded in a recording medium, and the program can also be provided through a network.

Effects of the Invention

The present invention can provide a vibration detection method, a signal processing device, and a program according to which it is possible to accurately detect vibration physically applied to an optical fiber, using a simple determination reference.

DESCRIPTION OF EMBODIMENTS

Figure 1:
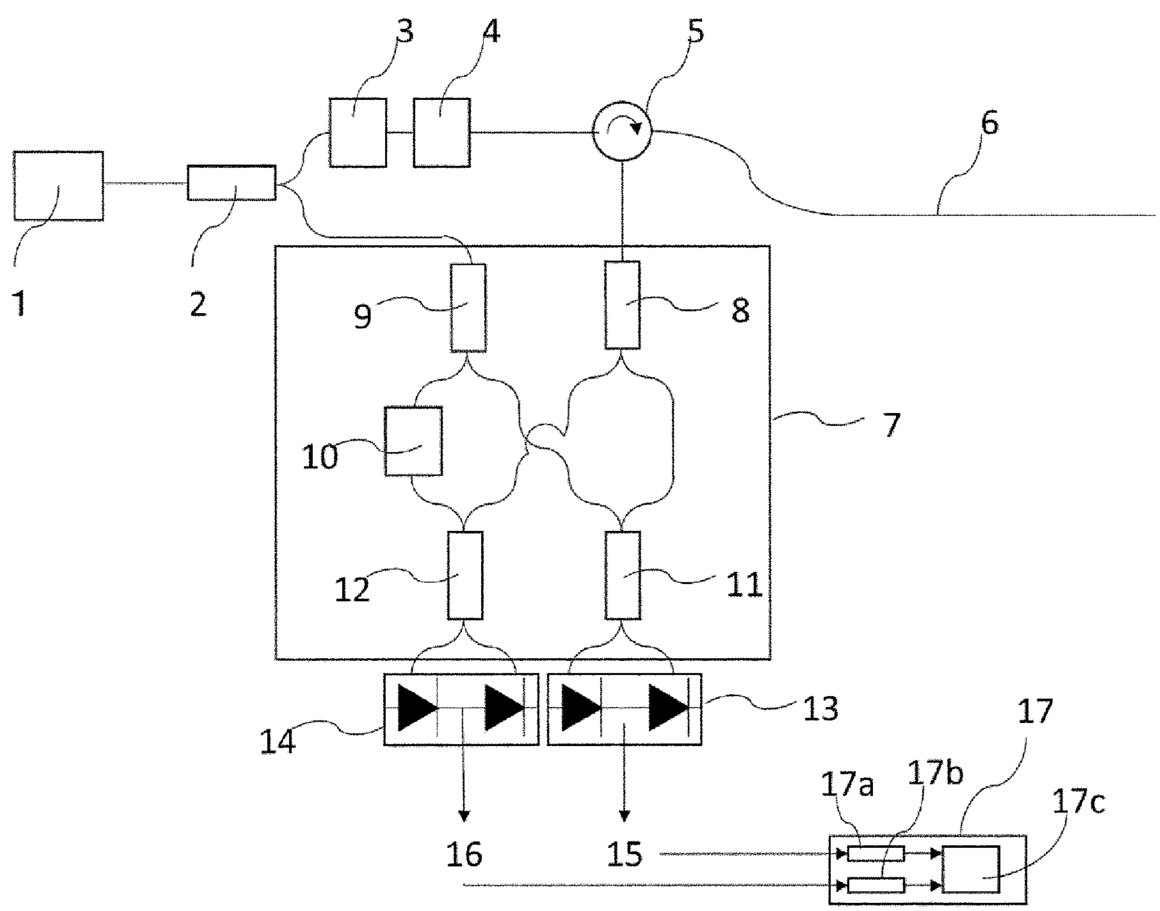
FIG. 1 is a diagram illustrating a signal processing device according to the present invention.

Embodiments of the present invention will be described with reference to the accompanying drawings. The embodiments described hereinafter are examples of the present invention, and the present invention is not limited to the following embodiments. Note that it is assumed that constituent elements with the same reference numerals in the present specification and the drawings indicate the same constituent elements.

FIG. 1 shows an device configuration for detecting scattered light. In FIG. 1, in order to detect scattered light, a configuration is used in which coherent detection in which detection is performed by multiplexing scattered light and a separately-prepared reference light is performed, and an optical 90-degree hybrid is used as a detection unit. Hereinafter, a vibration detection method of the present invention will be described taking this configuration as a specific example.

Continuous light of a single wavelength is emitted from a CW light source 1, and a reference light and a probe light are branched using a coupler 2. The probe light is pulsed by an intensity modulator 3, and the frequency is changed by a frequency shifter 4. Any type of intensity modular and frequency shifter may be used, a plurality thereof is used in some cases, and a device may also be used in which the functions of the intensity modulator and the frequency shifter are integrated. For example, it is possible to use pulsing and frequency shifting achieved by an LN modulator or an AO modulator. It is also possible to use a configuration which a frequency shift amount resulting from the frequency shifter is zero, that is, in which there is no frequency shifter. The pulsed probe light enters a measurement target optical fiber 6 via a circulator 5. Light that is scattered at points in the lengthwise direction of the optical fiber 6 returns to the circulator 5 as rearward scattered light, and enters one input of a 90-degree optical hybrid 7. The reference light branched by the coupler 2 enters the other input of the 90-degree optical hybrid 7.

Any internal configuration of the 90-degree optical hybrid may be used, as long as the function of the 90-degree optical hybrid is included. FIG. 1 shows an exemplary configuration. The rearward scattered light enters a coupler 8 with a 50:50 branching ratio, and the branched scattered light enters a coupler 12 with a 50:50 branching ratio and an input of a 50:50 coupler 11. The reference light enters a coupler 9 with a 50:50 branching ratio, and one of the two branched reference lights enters the input of the coupler 11 as-is. The other branched reference light is phase-shifted by a phase shifter 10 that shifts the phase by $\pi/2$ at the wavelength of the reference light, and thereafter enters the input of the coupler 12. The two outputs of the coupler 11 are detected by a balance detector 13, and an electrical signal 15 is acquired. The two outputs of the coupler 12 are detected by a balance detector 14, and an electrical signal 16 is acquired. The electrical signal 15 and the electrical signal 16 are transmitted to a signal processing device 17 that includes an AD conversion function element 17*a* and an AD conversion function element 17*b* that can sample a frequency band of a signal without aliasing. The signal processing device 17 performs calculation of the phase using a signal processing unit 17*c* based on digitized signals of an in-phase portion and an orthogonal portion output from the AD conversion function element 17*a* and the AD conversion function element 17*b*. Note that the signal processing device 17 is the signal processing device according to the present invention, and is an device that performs a later-described vibration detection method. Note that the signal processing device 17 can be realized also by a computer and a program, the program can also be recorded in a recording medium, and the program can also be provided through a network.

In DAS measurement, a pulsed probe light enters the measurement target optical fiber at a time t, and scattered light from the location at which the distance in the lengthwise direction from the input end of the optical fiber is l is detected. Due to the pulse light entering the measurement target optical fiber repeatedly at a time interval T, scattered light that occurs due to the probe lights in which the time t=nT, n being an integer, is measured, and the change over time in the scattered light is tracked at a time interval T. Note that if the time at which the probe lights enters is nT, the time at which the scattered light from the location with the distance l is detected is nT+T, where T is the amount of time for the light propagating through the optical fiber to make a round trip of a distance l. However, if the light is scattered light from the same location (i.e., the location with the same distance l), this delay amount T is constant, regardless of n. For this reason, in the following description, in order to avoid complexity, I will be omitted for the time of the scattered light as well, and the time will be written as nT.

The signal 15 is a measured value $I_{measure}(l,nT)$ obtained by adding noise to the in-phase component I(l,nT) of the scattered light obtained when there is no noise. The signal 16 is a measured value $Q_{measure}(l,nT)$ obtained by adding noise to the quadrature component Q(l,nT) of the scattered light obtained when there is no noise. That is, when the noise that is respectively overlaid on the in-phase component and the quadrature component is $N_I$ and $N_Q$, $$I_{measure}(l,nT)=I(l,nT)+N_I(l,tT) \quad (1)$$

$$Q_{measure}(l,nT)=Q(l,nT)+N_Q(l,nT) \quad (2)$$

are satisfied. Here, since the in-phase component and the quadrature component are detected using separated balance detectors, $N_I$ and $N_Q$ are independent, and have waveforms that are not correlated with each other.

In the in-phase component I(l,nT), there is uncertainty corresponding to a standard deviation $\sigma(N_I)$ of the noise $N_I$. Also, in the quadrature component Q(l,nT), there is uncertainty corresponding to a standard deviation $\sigma(N_Q)$ of the noise $N_Q$. If the intensity of the reference light is sufficiently large, shot noise of the reference light will be the main noise, but the intensities of the lights that enter the two balance detectors 13 and 14 in FIG. 1 are considered to be about the same, the standard deviations of the noises $N_I$ and $N_Q$ can also be considered to be of the same magnitude. Accordingly, the uncertainties of the in-phase component and the quadrature component are the same. Since the noise characteristics of the two balance detectors 13 and 14 can be considered to be the same also when noise at an electricity stage and onward, such as heat noise of a PD, cannot be ignored, the uncertainties are identical in the in-phase component and the quadrature component.

That is, if the uncertainties of the in-phase component I(l,nT) and the quadrature component Q(l,nT) are ΔI(l,nT) and ΔQ(l,nT) respectively, they are both identical, and are values that do not depend on the distance l or the time nT, and thus $$\Delta I(l,nT)=\Delta Q(l,nT)=N \tag{3}$$

is satisfied.

In DAS-I, the intensity of the scattered light is tracked, but the following signal amplitude A(l,nT) is used as an amount corresponding to the intensity of the scattered light. The signal amplitude A(l,nT) corresponds to the size of the vector formed by the measured values of the in-phase component and the quadrature component when the in-phase component is on the horizontal axis and the quadrature component is on the vertical axis.

$$A(l,nT)=\sqrt{I^2(l,nT)+Q^2(l,nT)} \tag{4}$$

In actual measurement, the measured value $A_{measure}$(l,nT) of the signal amplitude A(l,nT) is calculated using $I_{measure}$(l,nT) and $Q_{measure}$(l,nT), which are the measured values of the in-phase component and the quadrature component. Since the uncertainties of the quadrature component and the in-phase component are identical, the uncertainty ΔA(l,nT) of the signal amplitude A(l,nT) satisfies $$\Delta A(l,nT)=N \tag{5}$$

In this manner, in the measurement of the intensity of the scattered light in DAS-I, the uncertainty does not depend on the distance l or the time nT, and therefore it is possible to easily determine whether or not there is vibration by comparing the change over time in A(l,nT) with the uncertainty N. That is, it can be determined that the greater the change over time in A(l,nT) is, the higher the probability that vibration was applied is.

However, there is also a location at which, for example, a large vibration is actually applied but the change in A(l,nT) is small since the magnitude of the vibration cannot be obtained quantitatively based on the change over time in A(l,nT). At this kind of location, only the signal amplitude A(l,nT) is tracked, and therefore overlooking of the vibration may occur.

Depending on the type of the DAS-I, $A^2$(l,nT), which corresponds to the signal power, is tracked in some cases as well. The problem of overlooking of vibration that occurs when tracking the signal amplitude A(l,nT) similarly occurs also when tracking $A^2$(l,nT).

In DAS-P, the phase θ(l,nT) of the scattered light is measured, but the measured value $\theta_{measure}$(l,nT) of the phase is calculated as follows using the in-phase component and the quadrature component.

$$\theta_{measure}(l,nT)=\mathrm{Arctan}\left[\frac{Q_{measure}(l,nT)}{I_{measure}(l,,nT)}\right] \tag{6}$$

The operator Arctan indicates a four-quadrant inverse tangent.

In DAS-P, the vibration applied to any target segment from the distance l to the distance l+δl of the optical fiber lengthwise direction is tracked as the spatial difference of the phases provided below. Note that the distance l is described as the near end of the target segment and the distance l+δl is described as the far end of the target segment in some cases.

$$\delta\theta(l,nT)=\theta(l+\delta l,nT)-\theta(l,nT) \tag{7}$$

Here, δl is any value greater than or equal to a spatial resolution of a measurement device determined using the pulse width of a pulsed probe light. However, if δl is made larger, accurate measurement will no longer be possible due to the influence of phase noise and the like of a laser, and therefore it is desirable that the δl is approximately the spatial resolution of the measurement device.

In actual measurement, the measured value $\delta\theta_{measure}$(l, nT) is calculated based on the measured values $\theta_{measure}$(l+δl,nT) and $\theta_{measure}$(l,nT). Since the phase difference δθ(l, nT) linearly increases with respect to an increase in the magnitude of the vibration and the increase rate is also the same regardless of the distance l, if the phase difference is large, it can be thought that the vibration is also large.

However, the uncertainty Δδθ(l,nT) of the phase difference δθ(l,nT) depends on A(l,nT). This is because, due to the uncertainty propagation law, the uncertainty Δδθ(l,nT) of the phase difference δθ(l,nT) is calculated as $$\Delta\delta\theta(l,nT)=\sqrt{(\Delta\theta(l+\delta l,nT))^2+(\Delta\theta(l,nT))^2} \tag{8}$$

using the uncertainty Δδθ(l,nT) of θ(l,nT), and the uncertainty Δθ(l,nT) of the phase at each distance l depends on A(l,nT). In actuality, if the signal amplitude A(l,nT) is greater than the uncertainty N, the uncertainty Δθ(l,nT) can be evaluated as with the following formula.

$$\Delta\theta(l,nT)=\left|\mathrm{Arcsin}\left[\frac{N}{A(l,nT)}\right]\right| \tag{9}$$

Figure 5:
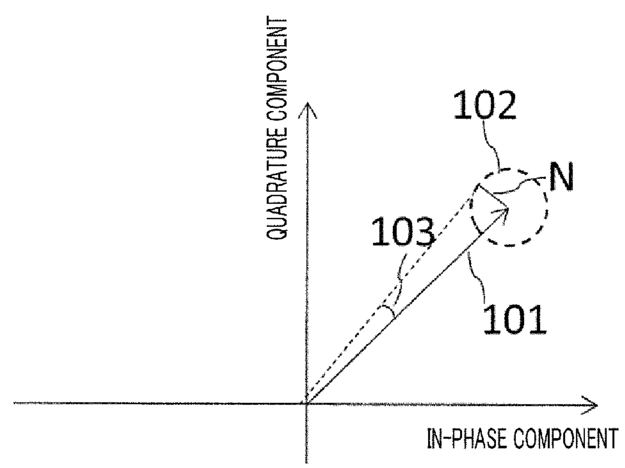
FIG. 5 is a diagram illustrating uncertainty of a phase.

FIG. 5 is a diagram illustrating a relevant state. When a vector of formula (9A)

$$r(l,nT)_{measure}=(I_{measure}(l,nT),Q_{measure}(l,nT)) \tag{9A}$$

obtained when there is no noise is expressed by arrow 101 on a two-dimensional plane in which the in-phase component is on the horizontal axis and the quadrature component is on the vertical axis, the size of the vector is A(l,nT). The uncertainty is a circle with a radius N centered about the vector $r(l,nT)_{measure}$. Accordingly, the uncertainty Δδθ(l,nT) of the angle of the vector can also be evaluated as approximately an angle 103.

Accordingly, the uncertainty of the phase difference δθ(l, nT) depends on the distance l and the time nT via A(l,nT), and therefore it cannot simply be determined that the greater the change in $\delta\theta_{measure}$(l,nT) is, the greater the probability that vibration has occurred is.

Also, as described above, even if the same vibration is applied, the amount of change in A(l,nT) changes depending on the distance l and the time nT. For this reason, even if the change over time in $\delta\theta_{measure}$(l,nT) is small, there are also a location and a time at which the change over time in A(l,nT) is large. However, in such a case, measuring only $\delta\theta_{measure}$(l,nT) will lead to overlooking of the vibration.

With the vibration detection method of the present embodiment, not only one of the intensity and the phase of the scattered light is tracked, but the vibration is measured with consideration given to changes in both of the intensity and the phase. That is, the vibration is measured by tracking the change in a vector formed by the measured values of the in-phase component and the quadrature component when the in-phase component is on the horizontal axis and the quadrature component is on the vertical axis. Also, in the present vibration detection method, vibration at another time with respect to a reference state is measured using, as a reference, a state of a fiber at a given time, or the like.

Figure 2:
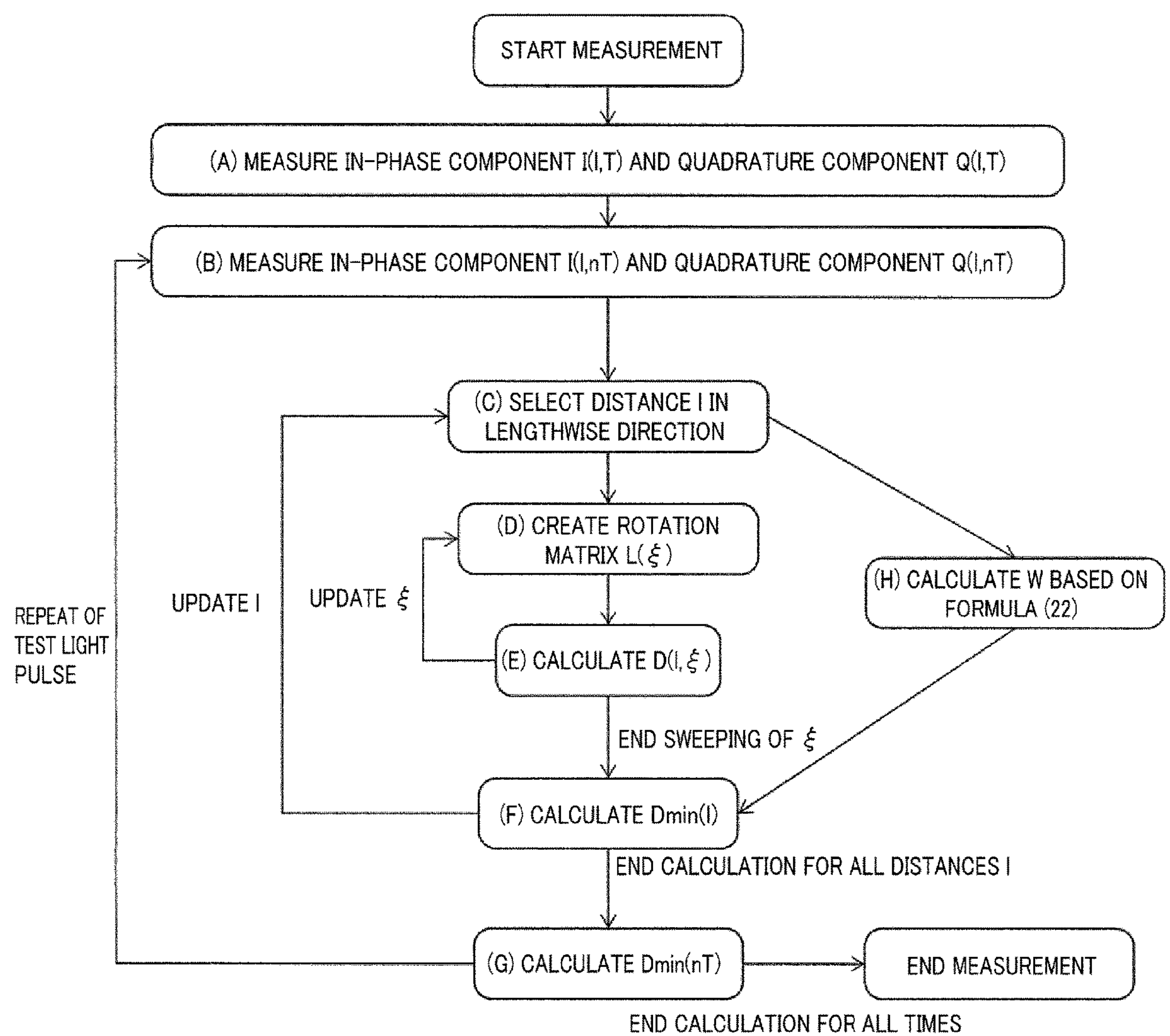
FIG. 2 is a flowchart illustrating a vibration detection method according to the present invention.

FIG. 2 is a flowchart illustrating the present vibration detection method. In the present vibration detection method, a measurement procedure of measuring in-phase components and quadrature components of scattered light generated by a light pulse that has entered a measurement target optical fiber, a vector acquisition procedure, and a detection procedure are performed.

In the vector acquisition procedure, reference vectors constituted by, among the in-phase components and the quadrature components of the scattered light detected in the measurement procedure, in-phase components and quadrature components at both ends of a given target segment of the measurement target optical fiber in a reference state, and measurement vectors constituted by in-phase components and quadrature components at both ends of the target segment of the measurement target optical fiber at a given time are acquired.

In the detection procedure, and it is determined that physical vibration has been applied to the target segment of the measurement target optical fiber when a triangular shape formed by a vector on a near end side of the target segment of the measurement target optical fiber and a vector on a far end side is envisioned for each of the reference vectors and the measurement vectors acquired in the vector acquisition procedure and shape change in a triangular shape formed by the measurement vectors with respect to a triangular shape formed by the reference vectors is a predetermined value or more.

In FIG. 2, the two procedures (A) and (B) correspond to the measurement procedure and the vector acquisition procedure, and the procedures (C) to (G) correspond to the detection procedure.

In the following example, a case will be described in which the state of the fiber at the first pulse is used as a reference (reference state).

In procedure (A), a vector at a distance l expressed by formula (9B) of the first pulse (n=1) and a vector at a distance l+δl expressed by formula (9C) are measured. Hereinafter, these vectors will be referred to as reference vectors.

$$r(l,T)_{measure}=(I_{measure}(l,T),Q_{measure}(l,T)) \tag{9B}$$

$$r(l+\delta l,T)_{measure}=(I_{measure}(l+\delta l,T),Q_{measure}(l+\delta l,T)) \tag{9C}$$

Here, as shown in FIG. 5, each vector is defined on a two-dimensional plane in which in-phase components are on the horizontal axis and quadrature components are on the vertical axis.

In the procedure (B), a vector at the distance l expressed by formula (9D) of the n-th pulse and a vector at the distance l+δl expressed by formula (9E) are measured. Hereinafter, these vectors will be referred to as measurement vectors.

$$r(t,nT)_{measure}=(I_{measure}(l,nT),Q_{measure}(l,nT)) \tag{9D}$$

$$r(l+\delta l,nT)_{measure}=(I_{measure}(l+\delta l,nT),Q_{measure}(l+\delta l,nT) \tag{9E}$$

If noise is ignored, in the case where the state of expansion and compression of the fiber at the time when the first pulse serving as a reference is incident and the state of expansion and compression of the fiber at the time when the n-th pulse is incident are the same in the segment from the distance l to the distance l+δl, $r(l,nT)_{measure}$ and $r(l+\delta l,nT)_{measure}$ are obtained by rotating by the same angle with respect to $r(l,T)_{measure}$ and $r(l+\delta l,T)_{measure}$. Also, using a rotation matrix R(l,n) that indicates rotation of a certain rotation angle, $$r(l,nT)_{measure}=R(l,n)r(l,T)_{measure} \tag{10}$$

$$r(l+\delta l,nT)_{measure}=R(l,n)r(l=\delta l,T)_{measure} \tag{11}$$

are satisfied. Accordingly, if a matrix operation is performed on an inverse rotation matrix $R^{-1}(l,n)$ that causes the same amount of rotation in a direction opposite to that of the rotation matrix R(l,n) and the measurement vectors of the time nT, the generated vectors match the reference vectors at time T as shown in formulas (12) and (13).

$$R^{-1}(l,n)r(l,nT)_{measure}=r(l,T)_{measure} \tag{12}$$

$$R^{-1}(l,n)r(l+\delta l,nT)_{measure}=r(l+\delta l,T)_{measure} \tag{13}$$

On the other hand, if the state of expansion and contraction of the fiber at the time at which the first pulse serving as a reference is incident and the state of expansion and contraction of the fiber at the time at which the n-th pulse is incident change due to the vibration applied to the segment from the distance l to the distance l+δl, changes occur in the angles formed by $r(l,nT)_{measure}$ and $r(l+\delta l, nT)_{measure}$ and in the size of each vector, and therefore there is no inverse rotation matrix $R^{-1}(l,n)$ as described above.

In other words, if the state of expansion and contraction of the fiber at the time at which the first pulse serving as a reference is incident in the segment from the distance l to the distance l+δl and the state of expansion and contraction of the fiber at the time at which the n-th pulse is incident are the same when noise is ignored, the triangular shape whose vertices are the origin (0,0), $$(I_{measure}(l,nT),Q_{measure}(l,nT)),\text{ and}$$

$$(I_{measure}(l+\delta l,nT),Q_{measure}(l+\delta l,nT))$$

does not change. On the other hand, if the state of expansion and contraction of the fiber at the time at which the first pulse serving as a reference is incident and the state of expansion and contraction of the fiber at the time at which the n-th pulse is incident have changed due to vibration applied in the segment from the distance l to the distance l+δl, a shape change occurs in the triangular shape.

Example 1

In the present example, changes in shape of the triangular shape are tracked using the following method. In the detection procedure, the difference between the reference vector and a vector obtained by rotating the measurement vector using a rotation matrix is calculated on the near end side and the far end side of the target segment of the measurement target optical fiber. Then, in the detection procedure, a minimum difference $D_{min}$, which is the minimum value of the difference obtained when the rotation achieved using the rotation matrix is changed, is used as the shape change.

In procedure (C), attention is given to the distance l. In procedure (D), a rotation matrix L(ξ) corresponding to the rotation angle ξ is created, and vectors obtained by performing a matrix operation on L(ξ) and $r(l,nT)_{measure}$ and $r(l+\delta l, nT)_{measure}$ are generated. Then, the differences between the generated vectors and the reference vectors $r(l,T)_{measure}$ and $r(l+\delta l, T)_{measure}$ serving as references are calculated. Specifically, in procedure (E), the following amount D(ξ) is calculated.

$$D(\xi)=\sqrt{\begin{array}{l}|L(\xi)r(l+\delta l,nT)_{measure}-r(l+\delta l,T)_{measure}|^2+\\|L(\xi)r(l,nT)_{measure}-r(l,T)_{measure}|^2\end{array}} \tag{14}$$

The rotation angle ξ is swept in a range of [0,2π) radians, the procedures (D) and (E) are repeated, and D is obtained as the function of ξ. Then, in the procedure (F), $D_{min}$ at the rotation angle $\xi_{min}$ at which D is at its minimum is obtained. Similar processing is performed also for other distances l, and $D_{min}$(l,nT) is obtained in the procedure (G). In the present example, the vibration is measured by calculating and tracking the physical amount of $D_{min}$(l,nT) at each time instead of the intensity and the phase of the scattered light.

The significance of tracking $D_{min}$ at each location will be stated hereinafter. Since the rotation amount of the rotation matrix R(l,n) depends also on the vibration that appears on the near side with respect to the distance l, a measurer cannot know the inverse rotation matrix $R^{-1}$(l,n) in advance. However, due to the rotation matrix L(ξ) being calculated while sweeping the rotation angle ξ, if noise is ignored, when there is no vibration, the minimum value $D_{min}$ will be zero when L(ξ) matches $R^{-1}$(l,n).

Figure 3:
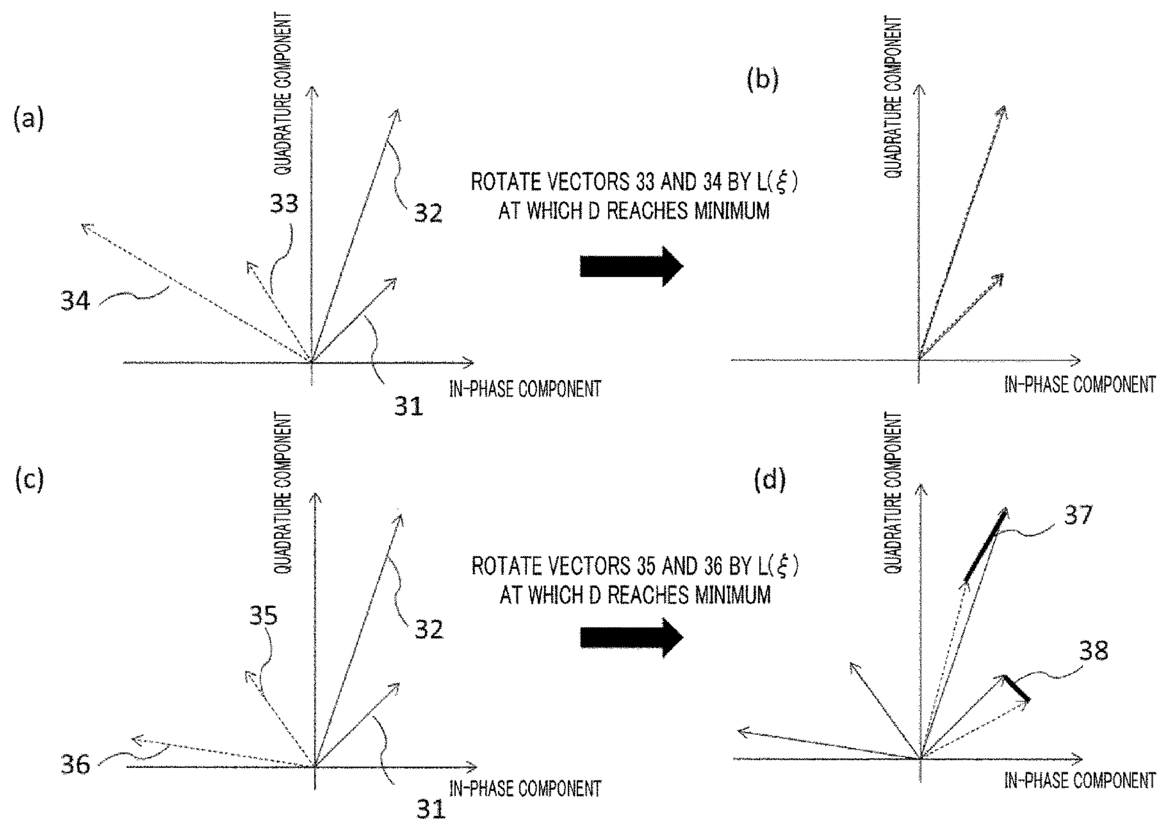
FIG. 3 is a vector diagram illustrating a vibration detection method according to the present invention.

FIGS. 3(*a*) and 3(*b*) illustrate vectors obtained when the minimum value $D_{min}$ is zero (when there is no vibration in the target segment). The vector 31 and the vector 32 are the reference vectors $r(l,T)_{measure}$ and $r(l+\delta l,T)_{measure}$ respectively. Even if no vibration has been applied in the segment from the distance l to the distance l+δl, which is the target segment, as long as vibration has occurred on the near side with respect to the distance l, rotation occurs in the reference vector of the time T as with the measurement vectors $r(l,nT)_{measure}$ and $r(l+\delta l,nT)_{measure}$ indicated by the vector 33 and the vector 34. Here, when the rotation angle ξ is swept and the rotation amount of the rotation matrix L(ξ) matches the rotation amount of $R^{-1}$(l,n), as shown in FIG. 3(*b*), $D_{min}$ reaches zero since it matches the reference vectors of the time T.

On the other hand, if vibration is applied to the segment from the distance l to the distance l+δl and a change occurs from the state of expansion and contraction of the measurement target optical fiber serving as a reference, there will definitely be a change in one of the angle formed by the measurement vectors $r(l,nT)_{measure}$ and $r(l+\delta l,nT)_{measure}$ and the respective sizes of the measurement vectors in comparison to the reference vectors of the time T, and therefore $D_{min}$ will not reach zero. In particular, the greater the phase change or the intensity change is, the more $D_{min}$ will increase, and therefore the vibration can be detected based on the magnitude of $D_{min}$.

FIGS. 3(*c*) and 3(*d*) illustrate vectors obtained when $D_{min}$#0 is satisfied (when there is vibration in the target segment). The vector 35 and the vector 36 are the measurement vectors $r(l,nT)_{measure}$ and $r(l+\delta l,nT)_{measure}$ respectively. When vibration is applied to the target segment, as with the vector 35 and the vector 36, a change will occur in the angles formed by the measurement vectors and in the sizes of the measurement vectors with respect to the vector 31 and the vector 32, which are the reference vectors. For this reason, even if the rotation matrix L(ξ) that provides $D_{min}$ and the measurement vectors are subjected to a matrix operation, since there are differences between the generated vectors and the vector 31 and the vector 32, which are the reference vectors, as indicated by thick line 37 and thick line 38 of FIG. 3(*d*), $D_{min}$ will not reach zero.

Example 2

In the present example, shape change in a triangular shape is tracked using the following method.

In the detection procedure, a value $D_{min}$ obtained using formula (C1) is used as the shape change, where $r_1$ is the size of the vector on the far end side of the target segment of the measurement target optical fiber among the reference vectors, and $\theta_1$ is the angle of the vector with respect to an axis of an in-phase component, $r_2$ is the size of the vector on the near end side of the target segment of the measurement target optical fiber among the reference vectors, and $\theta_2$ is the angle of the vector with respect to an axis of an in-phase component, $r_3$ is the size of the vector on the far end side of the target segment of the measurement target optical fiber among the measurement vectors, and $\theta_3$ is the angle of the vector with respect to an axis of an in-phase component, and $r_4$ is the size of the vector on the near end side of the target segment of the measurement target optical fiber among the measurement vectors, and $\theta_4$ is the angle of the vector with respect to an axis of an in-phase component.

$$D_{min}=\sqrt{r_1^2+r_2^2+r_3^2+r_4^2-W} \tag{C1}$$

$$W=2\sqrt{r_1^2r_3^2+r_2^2r_4^2+2r_1r_2r_3r_4\cos[(\theta_1-\theta_2)-(\theta_3-\theta_4)]}$$

In the present example, after the procedure (C), the procedure (H) is performed instead of performing the procedures (D) and (E). In the procedure (H), $D_{min}$ is obtained as follows based on the measured values of $r(l,T)_{measure}$, $r(l+\delta l,T)_{measure}$, $r(l,nT)_{measure}$, and $r(l+\delta l,nT)_{measure}$. First, the measurement vectors are indicated as follows using the sizes and angles of the vectors.

$$r(l,T)_{measure}=(r_1\cos\theta_1,r_1\sin\theta_1) \tag{15}$$

$$r(l+\delta l,T)_{measure}=(r_2\cos\theta_2,r_2\sin\theta_2) \tag{16}$$

$$r(l,nT)_{measure}=(r_3\cos\theta_3,r_3\sin\theta_3) \tag{17}$$

$$r(l+\delta l,nT)_{measure}=(r_4\cos\theta_4,r_4\sin\theta_4) \tag{18}$$

D is calculated as follows using ξ.

$$D=r_1^2+r_2^2+r_3^2+r_4^2+W\cos(\phi-\xi) \tag{19}$$

Here, W and φ satisfy the following equations.

$$W\cos\phi=-2r_1r_3\cos(\theta_1-\theta_3)-2r_2r_4\cos(\theta_2-\theta_4) \tag{20}$$

$$W\sin\phi=-2r_1r_2\sin(\theta_1-\theta_3)-2r_1r_4\sin(\theta_2-\theta_4) \tag{21}$$

In particular, letting W and φ be the size and the direction of the next vector $$(-2r_1r_3\cos(\theta_1-\theta_3)-2r_2r_4\cos(\theta_2-\theta_4),-2r_1r_3\sin(\theta_1-\theta_3)-2r_2r_4\sin(\theta_2-\theta_4)) \tag{21A}$$

It is possible to perform selection such that W is non-negative and φ is in a range of [0,2π). Based on formulas (20) and (21), W satisfies the following formula.

$$W=2\sqrt{r_1^2r_3^2+r_2^2r_4^2+2r_1r_2r_3r_4\cos[(\theta_1-\theta_2)-(\theta_3-\theta_4)]} \tag{22}$$

$D_{min}$ is realized when using an angle ξ according to which cos(φ−ξ) is −1.

$$D_{min}=\sqrt{r_1^2+r_2^2+r_3^2+r_4^2-W} \quad (23)$$

Accordingly, the calculation of D is not repeated while sweeping the rotation angle ξ in a range of [0,2π) radians as in the procedures (D) and (E), but W can be calculated based on the formula (22) and $D_{min}$ can be calculated using the formula (23) as in the procedure (H).

Effects of the Invention

In the vibration detection method, changes in both the intensity and the phase of the scattered light are incorporated by tracking $D_{min}$, and therefore it is possible to overcome overlooking of the vibration in the case where the phase change is small but the intensity change is large when vibration measurement is performed in DAS-P, and overlooking of the vibration in the case where the intensity change is small but the phase change is large when vibration measurement is performed in DAS-I.

Figure 4:
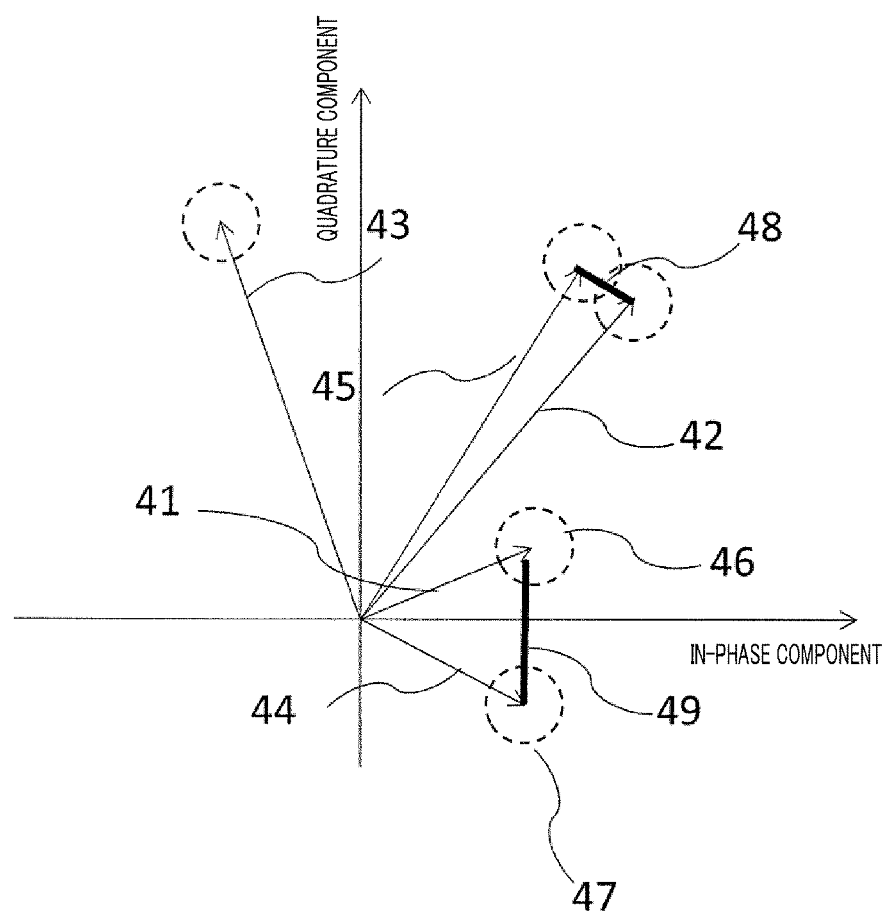
FIG. 4 is a diagram illustrating an effect of the present invention.

For example, FIG. 4 shows an example in which overlooking in DAS-I is overcome. The reference vectors $r(l,T)_{measure}$ and $r(l+\delta l,T)_{measure}$ in the case where there is no noise are the vector 41 and the vector 42. For the sake of simplicity, at the time nT, when a case is handled in which no vibration has been applied to the near side with respect to the distance l relative to the time T, the measurement vector $r(l,nT)_{measure}$ when there is no noise is the vector 41 and is the same as the reference vector. It is assumed that vibration has been applied between the distance l and the distance l+δl, and the measurement vector $r(l+\delta l,nT)_{measure}$ has changed to the vector 43 (it is assumed that there is no noise).

In DAS-I, the sizes of the vector 42, which is the reference vector, and the vector 43, which is the measurement vector, are compared. On the other hand, in the present vibration detection method, the measurement vectors $r(l,nT)_{measure}$ and $r(l+\delta l,nT)_{measure}$ are shifted to the vector 44 and the vector 45 by subjecting them and the rotation matrix L(ξ) that provides $D_{min}$ to a matrix operation. $D_{min}$ obtained when there is no noise is a value obtained by adding together the square of the distance 48 and the square of the distance 49 and finding the square root of the result.

Since noise accompanies the actual measured values, as indicated by a dotted-line circle 46, the vector 41, the vector 42, and the vector 43 include variation of about an uncertainty N. Although the rotation matrix L(ξ) that provides $D_{min}$ also changes due to the influence of noise, the uncertainties of the vector 44 and the vector 45 are also approximately N as indicated by the dotted-line circle 47. Accordingly, the uncertainties of the distance 48 and the distance 49 are each approximately √2×N, and if the distance 48 and the distance 49 are independent, the uncertainty of $D_{min}$ is also approximately √2×N. As shown in FIG. 4, the distance 49 is sufficiently long, and therefore even if the uncertainty is taken into consideration, $D_{min}$ can be evaluated as a value that is zero or more, and the vibration can be detected. However, in DAS-I, in which the sizes of the vector 42, which is the reference vector, and the vector 43, which is the measurement vector, are compared, when the uncertainty is taken into consideration, it is not possible to detect the vibration.

On the other hand, the overcoming of the overlooking in DAS-P can also similarly be understood by taking into consideration a case in which the vector 43, which is the measurement vector, has a small phase change but has a large change in vector size with respect to the vector 42, which is the reference vector. Since the above-described idea of the uncertainty is similarly established also when vibration has been applied on the near side relative to the distance l, it is possible to overcome overlooking of the vibration in DAS-I and DAS-P.

Also, in DAS-P, there has been a problem in that the uncertainty of the phase change of scattered light measured at each position at each time depends on the noise of the measurement device and the intensity of the scattered light, and therefore the uncertainty at each position at each time changes. In contrast to this, when $D_{min}$ is tracked, even if the change in the angle formed by $r(l,nT)_{measure}$ and $r(l+\delta l,nT)_{measure}$ is identical, the value of $D_{min}$ increases the greater the intensity of the scattered light is, and therefore the uncertainty of $D_{min}$ is approximately √2×N, which is determined based on the noise N of the measurement device, and this can be used in common at each position at each time.

Other Embodiments

The above description described a method of detecting scattered light through coherent detection using a 90-degree optical hybrid as shown in FIG. 1. However, if it is possible to measure the in-phase component and the quadrature component of the scattered light from each position at each time, the method for detecting the scattered light is not limited to coherent detection using a 90-degree optical hybrid. For example, the in-phase component of the scattered light may be measured and the quadrature component may be estimated through Hilbert transformation. The present vibration detection method is effective also in a configuration in which only scattered light is branched by a coupler without being multiplexed with a reference light, applying a delay to one resulting light, and once again multiplexing them using a coupler, or the like, and thereby detection is performed, and the quadrature component and the in-phase component are measured.

In the above description, although D(ξ) is calculated directly based on $I_{measure}(l,nT)$ and $Q_{measure}(l,nT)$, it is also possible to use a configuration in which the electrical signal 15 or the electrical signal 16 is passed through an electrical filter in a range in which the principle of the present vibration detection method holds true. Signal processing in which a digital filter is passed through may also be performed on digitized signals of the in-phase component and the quadrature component output from the AD conversion function element 17*a* and the AD conversion function element 17*b*.

Although the present vibration detection method proposes detecting vibration by tracking changes over time in each distance of $D_{min}$, regarding the reference state, in addition to using the first pulse shown in the procedure (A) of FIG. 2 as a reference, it is also possible to use the time of another pulse as a reference. Also, if a stationary state of the fiber can be prepared in advance, the reference in the stationary state may also be calculated as an average of repeated measurements performed through multiple measurements. A method in which the times between which the vibration is detected are tracked can also be used as a configuration in which the reference used when calculating $D_{min}$ at the time nT at which a certain pulse is incident is selected at the time (n−1)T, which is the time at which the prior pulse was incident.

Also, by tracking the change over time at each distance of $D_{min}$ using the present vibration detection method, the present invention may also be applied to signal processing in which the phase is calculated using DAS-P for each time of each distance at which vibration was uniquely detected, and the extension and contraction amount of vibration is faithfully reproduced.

Note that the present invention is not limited to the above-described exemplary embodiment as-is, and other than the above description, the present invention can be embodied by modifying the constituent elements without departing from the gist in the implementation stage.

Supplementary Note Hereinafter, the vibration detection method and the signal processing device of the present embodiment will be described.

(1): In the present vibration detection method, a procedure of measuring in-phase components and quadrature components of rearward scattered light that occurs when a light pulse enters a measurement target optical fiber and the light pulse that has entered propagates through the measurement target optical fiber;

a procedure of determining a reference vector constituted by an in-phase component and a quadrature component of the rearward scattered light in a reference state of the measurement target optical fiber;

a procedure of rotating a measurement vector using a rotation matrix, the measurement vector being constituted by an in-phase component and a quadrature component of the rearward scattered light at each time of the measurement target optical fiber;

a procedure of calculating an amount serving as a difference by comparing the rotated measurement vector and the reference vector; and a procedure of obtaining a minimum value of a difference amount with respect to a rotation amount of the rotation matrix are executed, and it is determined whether or not vibration has occurred in each segment of the measurement target optical fiber by tracking change over time in the minimum value of the difference amount for each segment in a lengthwise direction of the measurement target optical fiber.

(2): In the signal processing method according to (1) above, in the procedure of determining the minimum value of the difference amount, a minimum value $D_{min}$ of the difference value is determined using formula (C1), where $r_1$ is the size of the reference vector at an end point on the far end side of each segment in the lengthwise direction among the reference vectors, $\theta_1$ is the angle of that reference vector, $r_2$ is the size of the reference vector at an end point on the near end side of each segment, $\theta_2$ is the angle of that reference vector, $r_3$ is the size of the measurement vector at the end point on the far end side of each segment among the measurement vectors at each time, $\theta_3$ is the angle of that measurement vector, $r_4$ is the size of the measurement vector at the end point on the far end side of each segment, and $\theta_4$ is the angle of that measurement vector.

(3): The present signal processing device is connected to a phase OTDR that includes: a laser light source that outputs continuous light; branching means for branching the laser light source into a reference light and a probe light; an incidence means for causing the probe light to be incident on the measurement target optical fiber; a 90-degree optical hybrid that accepts, as input, rearward scattered light of the probe light and the reference light in the measurement target optical fiber; a first balance detector that obtains an electrical signal of an in-phase component by causing two outputs on the in-phase component side of the 90-degree optical hybrid to be incident; and a second balance detector that obtains an electrical signal of a quadrature component by causing two outputs on the quadrature component side of the 90-degree optical hybrid to be incident, and the present signal processing device performs the signal processing method according to (1) or (2) above using the measured value of the scattered light at each position in the lengthwise direction of the measurement target optical fiber.

Effect

The present invention proposes a method of accurately detecting vibration that is physically applied by tracking changes in a physical amount that is different from the phase and the intensity of the scattered light. By using the proposed method, changes in uncertainty that depend on the time and position in DAS-P can be eliminated without changing from the configuration (phase OTDR device) in which conventional DAS-P is implemented, and overlooking of vibration detection performed when DAS-I or DAS-P is used independently can be reduced.

REFERENCE SIGNS LIST

1 Light source
2, 8, 9, 11, 12 Coupler
3 Intensity modulator
4 Frequency shifter
5 Circulator
6 Measurement target optical fiber
7 90-degree optical hybrid
10 Phase shifter
13, 14 Balance detector
15, 16 Electrical signal
17 Signal processing device
17*a*, 17*b* AD conversion function element
17*c* Signal processing unit
31 to 36, 41 to 45, 101 Vector
46, 47, 102 Uncertainty
37, 38, 48, 49 Distance between vectors
103 Angle

The invention claimed is:

1. A vibration detection method comprising performing:

measuring in-phase components and quadrature components of scattered light generated by a light pulse that has entered a measurement target optical fiber;

acquiring reference vectors and measurement vectors, the reference vectors constituted by, among the in-phase components and the quadrature components of the scattered light, in-phase components and quadrature components at both ends of a given target segment of the measurement target optical fiber in a reference state, and the measurement vectors constituted by in-phase components and quadrature components at both ends of the target segment of the measurement target optical fiber at a given time; and determining that physical vibration has been applied to the target segment of the measurement target optical fiber when a triangular shape formed by a vector on a near end side and a vector on a far end side of the target segment of the measurement target optical fiber is envisioned for each of the reference vectors and the measurement vectors and shape change in a triangular shape formed by the measurement vectors with respect to a triangular shape formed by the reference vectors is a predetermined value or more;

wherein, on the near end side and the far end side of the target segment of the measurement target optical fiber, a difference between a vector obtained by rotating the measurement vector using a rotation matrix and the reference vector is calculated, and the minimum value of the difference obtained when rotation using the rotation matrix is changed is used as the shape change.

2. The vibration detection method according to claim 1, repeating the acquiring and the determining while moving the target region in the lengthwise direction of the measurement target optical fiber; and acquiring a lengthwise direction distribution of vibration applied to the measurement target optical fiber.

3. A vibration detection method comprising performing:

measuring in-phase components and quadrature components of scattered light generated by a light pulse that has entered a measurement target optical fiber;

acquiring reference vectors and measurement vectors, the reference vectors constituted by, among the in-phase components and the quadrature components of the scattered light, in-phase components and quadrature components at both ends of a given target segment of the measurement target optical fiber in a reference state, and the measurement vectors constituted by in-phase components and quadrature components at both ends of the target segment of the measurement target optical fiber at a given time; and determining that physical vibration has been applied to the target segment of the measurement target optical fiber when a triangular shape formed by a vector on a near end side and a vector on a far end side of the target segment of the measurement target optical fiber is envisioned for each of the reference vectors and the measurement vectors and shape change in a triangular shape formed by the measurement vectors with respect to a triangular shape formed by the reference vectors is a predetermined value or more;

wherein, a value $D_{min}$ obtained using formula (C1) is used as the shape change, where $r_1$ is the size of the vector on the far end side of the target segment of the measurement target optical fiber among the reference vectors, and $\theta_1$ is the angle of the vector with respect to an axis of an in-phase component, $r_2$ is the size of the vector on the near end side of the target segment of the measurement target optical fiber among the reference vectors, and $\theta_2$ is the angle of the vector with respect to an axis of an in-phase component, $r_3$ is the size of the vector on the far end side of the target segment of the measurement target optical fiber among the measurement vectors, and $\theta_3$ is the angle of the vector with respect to an axis of an in-phase component, and $r_4$ is the size of the vector on the near end side of the target segment of the measurement target optical fiber among the measurement vectors, and $\theta_4$ is the angle of the vector with respect to an axis of an in-phase component.

$$D_{min} = \sqrt{r_1^2 + r_2^2 + r_3^2 + r_4^2 - W} \quad \text{(C1)}$$

$$W = 2\sqrt{r_1^2 r_3^2 + r_2^2 r_4^2 + 2 r_1 r_2 r_3 r_4 \cos[(\theta_1 - \theta_2) - (\theta_3 - \theta_4)]}$$

4. The vibration detection method according to claim 3, repeating the acquiring and the determining while moving the target region in the lengthwise direction of the measurement target optical fiber; and acquiring a lengthwise direction distribution of vibration applied to the measurement target optical fiber.

5. A signal processing device comprising:

receiver for receiving in-phase components and quadrature components of scattered light generated by a light pulse that has entered a measurement target optical fiber, and acquiring reference vectors and measurement vectors, the reference vectors constituted by, among the in-phase components and the quadrature components of the scattered light, in-phase components and quadrature components at both ends of a given target segment of the measurement target optical fiber in a reference state, and the measurement vectors constituted by in-phase components and quadrature components at both ends of the target segment of the measurement target optical fiber at a given time; and detector for determining that physical vibration has been applied to the target segment of the measurement target optical fiber when a triangular shape formed by a vector on a near end side and a vector on a far end side of the target segment of the measurement target optical fiber is envisioned for each of the reference vectors and the measurement vectors and shape change in a triangular shape formed by the measurement vectors with respect to a triangular shape formed by the reference vectors is a predetermined value or more;

wherein, on the near end side and the far end side of the target segment of the measurement target optical fiber, the detector calculates a difference between a vector obtained by rotating the measurement vector using a rotation matrix and the reference vector, and uses the minimum value of the difference obtained when rotation using the rotation matrix is changed as the shape change.

6. A non-transitory computer-readable storage medium storing a program for causing a computer to function as the signal processing device according to claim 5.

7. A signal processing device comprising:

receiver for receiving in-phase components and quadrature components of scattered light generated by a light pulse that has entered a measurement target optical fiber, and acquiring reference vectors and measurement vectors, the reference vectors constituted by, among the in-phase components and the quadrature components of the scattered light, in-phase components and quadrature components at both ends of a given target segment of the measurement target optical fiber in a reference state, and the measurement vectors constituted by in-phase components and quadrature components at both ends of the target segment of the measurement target optical fiber at a given time; and detector for determining that physical vibration has been applied to the target segment of the measurement target optical fiber when a triangular shape formed by a vector on a near end side and a vector on a far end side of the target segment of the measurement target optical fiber is envisioned for each of the reference vectors and the measurement vectors and shape change in a triangular shape formed by the measurement vectors with respect to a triangular shape formed by the reference vectors is a predetermined value or more;

wherein the detector uses a value $D_{min}$ obtained using formula (C1) as the shape change, where $r_1$ is the size of the vector on the far end side of the target segment of the measurement target optical fiber among the reference vectors, and $\theta_1$ is the angle of the vector with respect to an axis of an in-phase component, $r_2$ is the size of the vector on the near end side of the target segment of the measurement target optical fiber among the reference vectors, and $\theta_2$ is the angle of the vector with respect to an axis of an in-phase component, $r_3$ is the size of the vector on the far end side of the target segment of the measurement target optical fiber among the measurement vectors, and $\theta_3$ is the angle of the vector with respect to an axis of an in-phase component, and $r_4$ is the size of the vector on the near end side of the target segment of the measurement target optical fiber among the measurement vectors, and $\theta_4$ is the angle of the vector with respect to an axis of an in-phase component.

$$D_{min} = \sqrt{r_1^2 + r_2^2 + r_3^2 + r_4^2 - W} \quad \text{(C1)}$$

$$W = 2\sqrt{r_1^2 r_3^2 + r_2^2 r_4^2 + 2 r_1 r_2 r_3 r_4 \cos[(\theta_1 - \theta_2) - (\theta_3 - \theta_4)]}$$

8. A non-transitory computer-readable storage medium storing a program for causing a computer to function as the signal processing device according to claim 7.

* * * * *